(12) United States Patent
Kim

(10) Patent No.: US 6,720,998 B1
(45) Date of Patent: Apr. 13, 2004

(54) DEVICE FOR MANAGING SNAP SHOT IN USB CAMERA AND METHOD THEREFOR

(75) Inventor: Do Hyung Kim, Seoul (KR)

(73) Assignee: LG Semicon Co., Ltd., Chungcheongbuk-do (KR)

(*) Notice: Subject to any disclaimer, the term of this patent is extended or adjusted under 35 U.S.C. 154(b) by 0 days.

(21) Appl. No.: 09/291,975

(22) Filed: Apr. 15, 1999

(30) Foreign Application Priority Data

Dec. 26, 1998 (KR) .................................. 1998/58903

(51) Int. Cl.$^7$ .................... H04N 7/14; H04N 11/00; H04N 7/00; H04N 5/225; H04N 5/08
(52) U.S. Cl. .................... 348/220.1; 348/14.12; 348/24; 348/207.1; 348/526
(58) Field of Search .................... 348/220.1, 14.12, 348/24, 207.1, 513, 526

(56) References Cited

U.S. PATENT DOCUMENTS

| | | | |
|---|---|---|---|
| 5,659,575 A | | 8/1997 | Vielhaber et al. ............ 375/213 |
| 5,969,750 A | * | 10/1999 | Hsieh et al. ................ 348/14.1 |
| 6,005,613 A | * | 12/1999 | Endsley et al. ........... 348/231.6 |
| 6,151,069 A | * | 11/2000 | Dunton et al. ............ 348/220.1 |
| 6,215,515 B1 | * | 4/2001 | Voois et al. .............. 348/14.01 |
| 6,288,800 B1 | * | 9/2001 | Izumi ......................... 358/468 |
| 6,359,643 B1 | * | 3/2002 | Visvanathan et al. .... 348/14.14 |
| 2001/0050712 A1 | * | 12/2001 | Dunton et al. .............. 348/220 |

* cited by examiner

Primary Examiner—Wendy R. Garber
Assistant Examiner—James Hannett
(74) Attorney, Agent, or Firm—Morgan, Lewis & Bockius LLP

(57) ABSTRACT

Device and method for managing a snap shot in a USB camera, the device including a camera for taking, and digitizing an image, and providing the image through an end point exclusive for an image, an interface unit for inserting either a frame sync pattern between frames of image data provided through an end point exclusive for an image or a snap shot sync pattern instead of the frame sync pattern in a snap shot mode, and a USB host for displaying an image data provided from the interface unit on a monitor in the USB host or forwarding for a picture communication, the method including the steps of (1) determining turning on/off of a snap shot button on the camera, (2) according to a result of the determination, either inserting a frame sync pattern between frames of image data and providing to the USB host, or inserting a snap shot sync pattern instead of the frame sync pattern and providing to the USB host, and (3) either displaying an image data having the frame sync pattern or the snap shot sync pattern inserted thereto on a monitor or transmitting the image data to other external USB host, whereby improving a USB performance since the end point exclusive for an image can be used for other purposes, and reducing a number of pins and simplifying a system of the driver in view of the position of the host, in a case when the end point exclusive for snap shot is not used for other purpose.

8 Claims, 4 Drawing Sheets

DEVICE FOR MANAGING SNAP SHOT IN USB CAMERA AND METHOD THEREFOR

BACKGROUND OF THE INVENTION

1. Field of the Invention

The present invention relates to an image capturing of a USB(Universal Serial Bus) camera and more particularly, to a device for managing a snap shot in a USB camera, which is suitable for implementing a snap shot mode; and a method therefor.

2. Field of the Invention

In general, the USB(Universal Serial Bus) is spot lighted as a standard for a serial bus in a PC system. In order to integrate a variety of peripheral interfaces to a PC system, including PS/2, RS232C, parallel ports, and the like, a standard specification of the USB is provided. Being a bus capable of supporting 12 Mbps at the maximum, the USB is paid attention as a PC system of the next generation because the USB allows connection of 63 devices thereto. The USB allows various peripheral devices, such as a camera and a printer, to be used connected to a computer, i.e., a USB host. There is an interface unit between the peripheral devices and the USB host for interfacing function.

A related art method for managing a snap shot in a USB camera will be explained with reference to the attached drawings. The method requires synchronizing patterns indicating a start and an end of the image. In a frame unit transmission of the images, a synchronizing signal generating unit 13a provided in the interface unit 13 inserts the sync pattern between frames, permitting the USB host 15 to detect the start and the end of the image with easy. A performance of the USB host 15 will be degraded if the sync pattern is not inserted because the USB host 15 is required to conduct much operation for distinguishing between frames. Thus, the insertion of the sync pattern prevent the degradation of the USB host 15 performance.

The foregoing related art method for managing a snap shot in a USB camera will be explained in detail. FIG. 2 illustrates an operation timing diagram showing the related art snap shot implementation.

The camera 11 digitizes an image and forwards to an interface unit 13 through an end point exclusive for video. The interface unit 13 inserts a sync pattern between frames for indicating a start or an end of an image. Upon pressing a snap shot button 11a fitted to a camera 11, an image data(frame 3) is provided to the interface unit 13 through the end point exclusive for snap shot. An FIFO(First In First Out) unit 13b in the interface unit 13 stores the image data provided through the end point exclusive for snap shot.

FIG. 1 illustrates a block diagram schematically showing a system for explaining a related art method for managing a snap shot in a USB camera.

Referring to FIG. 1, the system is provided with a camera 1, an interface unit 13, and a USB host 15. There are a plurality of end points between the camera 11 and the interface unit 13; one of which is exclusively used as an end point for a snap shot and another one of which is exclusively used as an end point for image. The camera 11 receives, and digitizes the image and provides to the interface unit 13. And, the interface unit 13 converts the digitized image received through the end point to suit to a USB standard specification, and provides to the USB host 15. The USB host 15 either displays the digitized image on its monitor, or transmits to an opposite USB host (not shown) in a picture communication. As shown in FIG. 1, there are a plurality of end points connected between the camera 11 and the interface unit 113, each of which has a different service; for example, there are an end point exclusive for an image at one side, and an end point exclusive for snap shot at the other side. The end point exclusive for an image transmits a moving picture data digitized in the camera 11. The FIFO unit 13b is provided just in case when the USB host 15 does not sense a pressing of the snap shot button, yet. Thus, provided an image data is stored in the FIFO unit 13b as the snap shot button 11a is pressed, the interface unit 13 provides the data stored in the FIFO unit 13b to the USB host 15 according to request from the USB host 15. Then, the USB host 15, after storing the image data in a hard disk, either displays on a monitor, or provides to other USB host.

However, the method for managing a snap shot in a USB camera has the following problems. That is, the additional end point exclusive for snap shot and the FIFO unit for storage of a video data from the snap shot results in a complicated system, the end point exclusive for snap shot can not be used other than the snap shot, and the USB host should be provided with a complicated driver system and a complicated application program for such an end point exclusive for snap shot.

SUMMARY OF THE INVENTION

Accordingly, the present invention is directed to a device for managing a snap shot in a USB camera that substantially obviates one or more of the problems due to limitations and disadvantages of the related art.

An object of the present invention is to provide a device for managing a snap shot in a USB camera, in which an existing end point can be used for other service for improving an USB performance.

Another object of the present invention is to provide a device for managing a snap shot in a USB camera, in which one end point is reduced when a snap shot end point is not used for other purpose, for simplifying a system and reducing a chip size.

Additional features and advantages of the invention will be set forth in the description which follows, and in part will be apparent from the description, or may be learned by practice of the invention. The objectives and other advantages of the invention will be realized and attained by the structure particularly pointed out in the Written description and claims hereof as well as the appended drawings.

To achieve these and other advantages and in accordance with the purpose of the present invention, as embodied and broadly described, the device for managing a snap shot in a USB camera, includes a camera for taking, and digitizing an image, and providing the image through an end point exclusive for an image, an interface unit for inserting either a frame sync pattern between frames of image data provided through an end point exclusive for an image or a snap shot sync pattern instead of the frame sync pattern in a snap shot mode, and a USB host for displaying an image data provided from the interface unit on a monitor in the USB host or forwarding for a picture communication.

In the other aspect of the present invention, there is provided a method for managing a snap shot in a USB camera, including the steps of (1) determining turning on/off of a snap shot button on the camera. (2) according to a result of the determination, either inserting a frame sync pattern between frames of image data and providing to the USB host, or inserting a snap shot sync pattern instead of the frame sync pattern and providing to the USB host, and (3)

either displaying an image data having the frame sync pattern or the snap shot sync pattern inserted thereto on a monitor or transmitting the image data to other external USB host It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
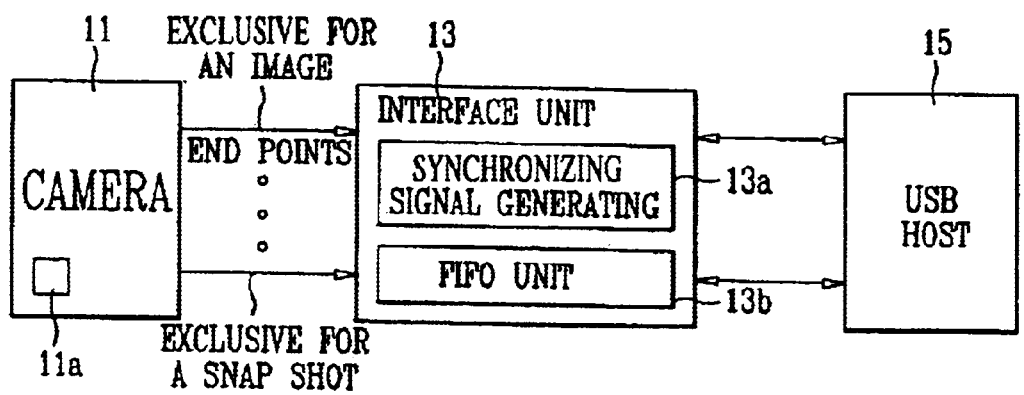
FIG. 1 illustrates a block diagram schematically showing a system for explaining a related art method for managing a snap shot in a USB camera.
Figure 2:
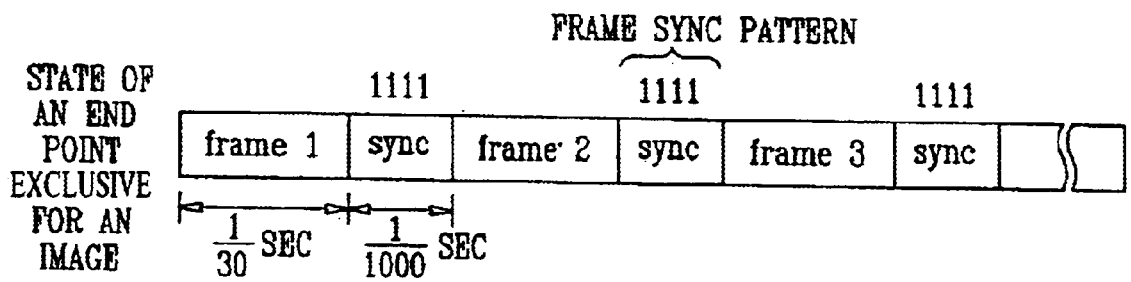
FIG. 2 illustrates an operation timing diagram showing the related art snap shot implementation.
Figure 2:
Figure 2:
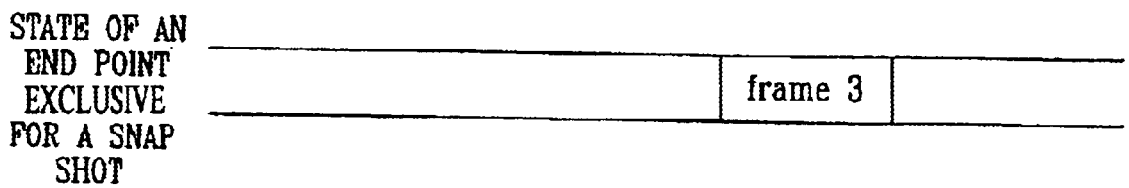
Figure 3:
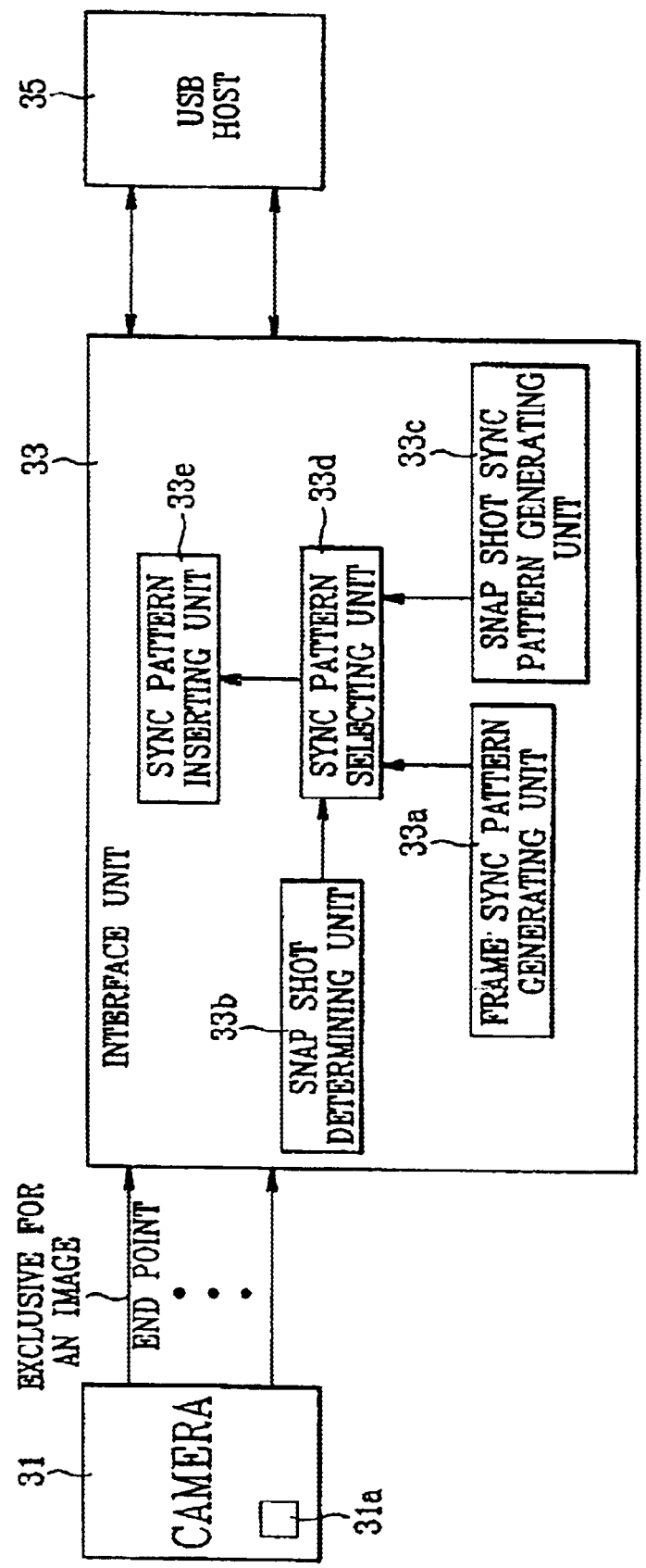
FIG. 3 illustrates a block diagram schematically showing a system for explaining a device for managing a snap shot in a USB camera in accordance with a preferred embodiment of the present invention.

Reference will now be made in detail to the preferred embodiments of the present invention, examples of which are illustrated in the accompanying drawings. FIG. 3 illustrates a block diagram schematically showing a system for explaining a device for managing a snap shot in a USB camera in accordance with a preferred embodiment of the present invention.

Referring to FIG. 3, the device for managing a snap shot in a USB camera in accordance with a preferred embodiment of the present invention includes a camera 31 for taking, and digitizing an image, and providing through an end point exclusive for an image, an interface unit 33 for selectively inserting a frame sync pattern or a snap shot sync pattern between frames of video data provided through the end point, and a USB host 35 for displaying, or forwarding a moving picture data, or a snap shot data provided from the interface unit 33 outside of the camera. Systems of the camera 31 and the USB host 35 are identical to those of the related art, but the interface unit 33 has a system as follows. That is, the interface unit 33 includes a frame sync pattern generating unit 33a for generating a frame sync pattern, a snap shot determining unit 33b for determining a snap shot according to on/off of a snap shot button 31a on the camera 31, a snap shot sync pattern generating unit 33c for generating snap shot sync pattern according to a turn on of the snap shot button 31a, a sync pattern selecting unit 33d for selecting one of the outputs from the sync pattern generating unit 33a and the snap shot sync pattern generating unit 33c, and a sync pattern inserting unit 33e for inserting a sync pattern from the sync pattern selecting unit 33d between frames through an end point exclusive for an image. The sync pattern selecting unit 33d may includes a multiplexer and uses a signal from the snap shot determining Unit 33b as a selection signal.

Figure 4:
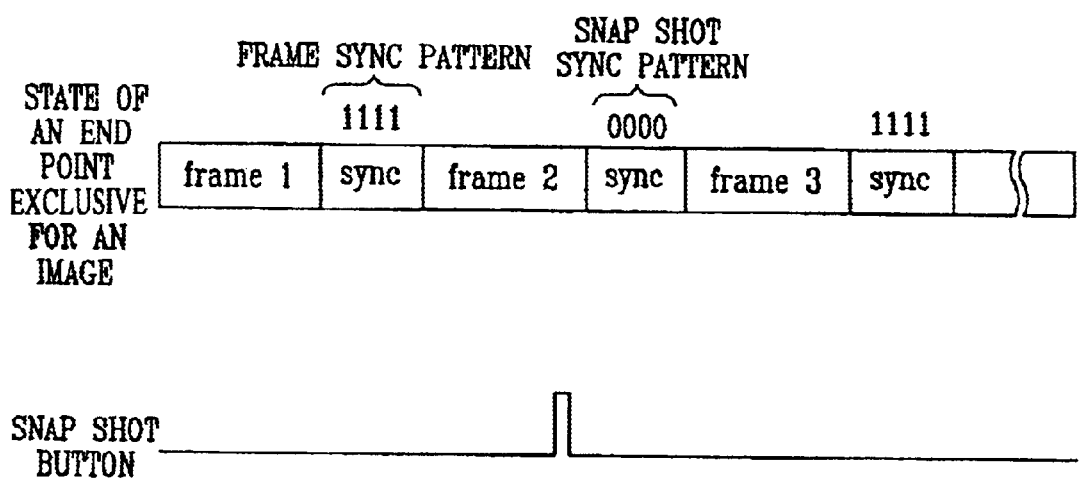
FIG. 4 illustrates an operation timing diagram showing the snap shot implementation of the present invention.

The operation of the device for managing a snap shot of the present invention having the foregoing system applied thereto will be explained with reference to FIGS. 3 and 4. FIG. 4 illustrates an operation timing diagram showing the snap shot implementation of the present invention.

The camera 31 digitizes, and provides an image to the interface unit 33 through the end point exclusive for an image. In this instance, as far as the snap shot button 31a on the camera 31 is not pressed, the interface unit 33 inserts a frame sync pattern 1111 between frames for indicating a start or an end of a frame. That is, as the sync pattern selecting unit 33d selects an output of the frame sync pattern generating unit 33a, the sync pattern inserting unit 33e inserts the frame sync pattern 1111 between frames through the end point exclusive for an image. On the other hand, if the snap shot button 31a on the camera 31 is pressed, the snap shot determining unit 33b senses it and provides a selection signal to the sync pattern selecting unit 33d. According to this, the sync pattern selecting unit 33d selects a snap shot sync pattern from the snap shot sync pattern generating unit 33c instead of the frame sync pattern from the frame sync pattern generating unit 33a presently. Accordingly, the sync pattern inserting unit 33e inserts the snap shot sync pattern 0000 from the snap shot sync pattern generating unit 33c between frames. That is, by inserting the snap shot sync pattern 0000 instead of the frame sync pattern 1111 distinguishing between frames, the USB host 35 is made to sense a snap shot. As the USB host 35 knows the snap shot sync pattern, the USB host 35 stores a frame at a time point when the snap shot sync pattern is received to a hard disk. Here, the snap shot frame may be a frame before or after a time point when the sync pattern is generated, which is determined in the USB host 35.

Figure 5:
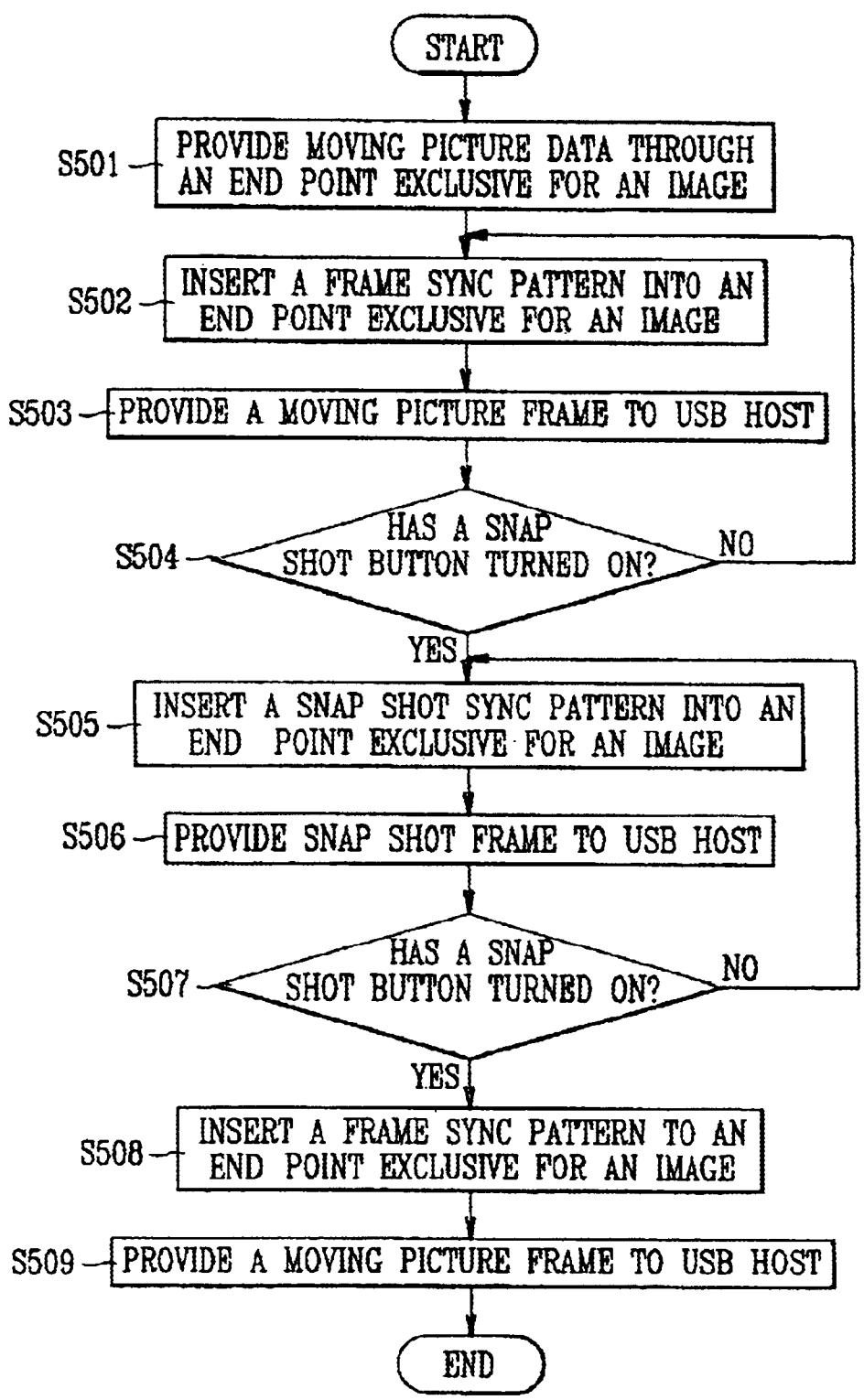
FIG. 5 illustrates a flow chart showing a method for managing a snap shot in a USB camera in accordance with a preferred embodiment of the present invention.

A method for managing a snap shot of the present invention will be explained in more detail with reference to the flow chart illustrated in FIG. 5.

The method for managing a snap shot of the present invention starts with a step for a camera 31 taking, and digitizing an external image, and providing to an interface unit 33 through an end point exclusive for an image.(S501). Then, an interface unit 33 inserts a frame sync pattern for distinguishing between frames(S502), and provides a moving picture frame to a USB host 35 according to a request from the USB host 35.(S503). Turning on/off of the snap shot button is determined during the provision of the moving picture frame(S504), to continue the frame sync pattern insertion and provision if the snap shot button is at off. If the snap shot button is turned on, a snap shot determining unit 33b provides a control signal to the sync pattern selecting unit 33d. Then, the sync pattern selecting unit stops the flame sync pattern forwarded up to the present time, and selects and forwards the snap shot sync pattern, to insert the snap shot sync pattern between the frames.(S505). Upon a perfect insertion of the snap shot sync pattern, the sync pattern inserting unit 33e informs the perfect insertion to the sync pattern selecting unit 33d. The USB host 35 senses the snap shot sync pattern and either stores a pertinent frame to a hard disk or forwards to an external USB host.(S506). Thereafter, another turn on of the snap shot is checked (S507), and if found another turning on of the snap shot button 31a, the process when the snap shot button is turned on is repeated, and not turned on, the sync pattern selecting unit 33d selects the frame sync pattern instead of the snap shot sync pattern. According to this, the sync pattern inserting unit 33e inserts the frame sync pattern from the sync pattern selecting unit 33d between frames received through the end point exclusive for an image.(S508). The moving picture having the sync pattern inserted thereto is provided to the USB host.(S509).

The device and method for managing a snap shot in a USB camera of the present invention as explained has the following advantages.

First, since the end point exclusive for an image can be used for other purposes, a USB performance can be improved.

Second, a number of pins can be reduced and a system of the driver can be simplified in view of the position of the host, in a case when the end point exclusive for snap shot is not used for other purpose.

It will be apparent to those skilled in the art that various modifications and variations can be made in the device and method for managing a snap shot in a USB camera of the present invention without departing from the spirit or scope of the invention. Thus, it is intended that the present invention cover the modifications and variations of this invention provided they come within the scope of the appended claims and their equivalents.

What is claimed is:

1. A device for managing a snap shot in a USB camera comprising:
   a camera for taking, and digitizing an image into an image data, and providing the image data through an end point exclusive for an image;
   an interface unit that receives the image data through the end point exclusive for an image and processes the image data; and
   a USB host that receives processed image data from the interface unit and displays the processed image data on a monitor in the USB host, or forwards the processed image data for a picture communication;
   wherein the interface unit comprises:
      a frame sync pattern generating unit for generating a frame sync pattern for indicating that the processed image data preceding the frame sync pattern is moving picture data, thereby indicating an end of a moving picture frame;
      a snap shot sync pattern generating unit for generating a snap shot sync pattern for indicating that the processed image data preceding the snap shot sync pattern is snap shot image data, thereby indicating an end of a snap shot frame;
      a snap shot determining unit for determining an on/off of a snap shot button on the camera;
      a sync pattern selecting unit for selecting as a sync pattern one of the outputs from the frame sync pattern generating unit and the snap shot sync pattern generating unit according to a signal from the snap shot determining unit; and
      a sync pattern inserting unit that inserts the sync pattern from the sync pattern selecting unit between frames of image data through an end point exclusive for an image, wherein the sync pattern indicates that the image data preceding the sync pattern is a moving picture frame or a snap shot frame, the data preceding the sync pattern is image data, and the data following the sync pattern is image data, thereby the sync pattern indicating the end of the moving picture frame or the end of the snap shot frame.

2. A device as claimed in claim 1, wherein the sync pattern selecting unit includes a multiplexer.

3. A device as claimed in claim 2, wherein a signal from the snap shot determining unit is used as a selection signal in the multiplexer.

4. A device as claimed in claim 1, wherein the frame sync pattern is a sync pattern for sensing by the USB host inserted between frames of image data received through the end point exclusive for an image.

5. A device as claimed in claim 1, wherein the snap shot sync pattern is inserted instead of the frame sync pattern when a snap shot button on the camera is turned on.

6. A method for managing a snap shot in a USB camera, in which a snap shot image or a moving picture frame is provided to a USB host in a course of providing an image data from the USB camera to the USB host through an end point exclusive for an image, the method comprising the steps of:
   (1) determining turning on/off of a snap shot button on the camera;
   (2) according to a result of the determination, either inserting a frame sync pattern between frames of image data and providing to the USB host, or inserting a snap shot sync pattern instead of the frame sync pattern and providing to the USB host, wherein the sync pattern indicates that the image data preceding the sync pattern is a moving picture frame or a snap shot frame, the data preceding the sync pattern is image data, and the data following the sync pattern is image data; and
   (3) either displaying an image data having the frame sync pattern or the snap shot sync pattern inserted thereto on a monitor or transmitting the image data to other external USB host.

7. A method as claimed in claim 6, wherein the snap shot sync pattern is a specific pattern agreed with the USB host.

8. A method as claimed in claim 7, wherein the USB host stores one frame before or after detection of the sync pattern upon reception of the agreed sync pattern.

* * * * *